United States Patent [19]
Orain

[11] 3,792,598
[45] Feb. 19, 1974

[54] INTERNAL BIASING ASSEMBLY AXIALLY RETAINING COUPLINGS
[75] Inventor: Michel Orain, Conflans-Saintephonorine, France
[73] Assignee: Societe Anonyme: Glaenzer Spicer, Poissy, France
[22] Filed: Jan. 19, 1973
[21] Appl. No.: 324,991

[30] Foreign Application Priority Data
Mar. 14, 1972 France .............................. 72.08866

[52] U.S. Cl. ......................................... 64/21, 64/8
[51] Int. Cl. ............................................... F16d 3/30
[58] Field of Search ................................. 64/21, 8, 7

[56] References Cited
UNITED STATES PATENTS
3,757,534  9/1973  Orain ......................................... 64/8
3,151,473  10/1964  Cull ........................................... 64/8
3,125,870  3/1964  Orain ......................................... 64/7
2,182,455  12/1939  Smith ......................................... 64/7

FOREIGN PATENTS OR APPLICATIONS
1,272,530  3/1962  France ................................... 64/21

Primary Examiner—Benjamin W. Wyche
Assistant Examiner—Randall Heald
Attorney, Agent, or Firm—Baldwin, Wight & Brown

[57] ABSTRACT
An assembly for internal biasing and axially retaining a constant velocity universal joint of the type having a cup-shaped member, a forked member, spindles received in rollers for rolling and sliding in races formed between the prongs of the forked member, the spindles being associated with a knoblike portion. The assembly assures a constant biasing force for maintaining the contact between the knoblike portion and the closed inner end wall of the forked member. The biasing force is exerted by a coil spring arranged between the knoblike portion and a retaining clip adapted to be secured onto the prongs of the forked member for effectively joining the cup-shaped member to the forked member. A push member is provided having a spherical cavity for contact with the knoblike portion at one end and a portion with an enlarged polygonal cross-section at its other end which extends through a corresponding hole in the retaining clip when the arms are being secured to the prongs and retracted when the other end portion is in alignment with the hole in the clip for guiding thereon. The apices of the portion having the polygonal cross-section latch the push member relative to the clip, and may be released by pivoting the forked member relative to the cup-shaped member which causes cam surfaces on the push member to rotate the push member into or out of alignment with the corresponding hole in the clip. In addition or alternatively fingers with latching teeth may be provided with an equal number of corresponding holes in the clip.

15 Claims, 15 Drawing Figures

INTERNAL BIASING ASSEMBLY AXIALLY RETAINING COUPLINGS

The present invention concerns an internal baising assembly axially retaining couplings. In particular the invention relates to assembling constant velocity universal joints with three rollers used for transmitting torque between two shafts at relative fixed or variable angles up to 45°.

In such joints, the axial joining of the forked member to the cup-shaped member has been an operation difficult to carry out. Indeed, the joining is ensured by means of a three-arm star-shaped part enclosed in the cup-shaped member. After the part is secured in position, it must apply a biasing force of a predetermined value in the axial direction so that there is no possible relative axial displacement between the forked member and the cup-shaped member under the effect of the various forces thereon regardless of the tolerances of the parts in use in the axial connection.

An aim of the present invention is an internal axial retaining assembly having the following advantages:

1. a relative axial holding action with the desired biasing force which is not effected to any considerable extent by mass production tolerances;
2. intensive use of the coupling without any detrimental effect on the biasing force and without damaging the parts;
3. easy and rapid assembly and disassembly without requiring any substantial force to be exerted by the person carrying it out;
4. great simplicity, easy manufacture and substantial savings.

The assembly according to the invention for a conventional constant velocity universal joint of the type comprising a forked member fixed to one of the shafts to be coupled and having three angularly spaced prongs with linear roller races therebetween in which three rollers may slide and roll on three spindles or journals arranged in a star pattern about a knoblike portion with two spherical surfaces and fixed to a cup-shaped member on a second shaft, the assembly comprising a push member, a spherical concave cavity at one end of said push member having three radial cut-outs with V-shaped edges, said cavity bearing on one of the spherical surfaces of said knoblike portion, said push member guided in opening(s) in a star-shaped retaining clip with three arms which are to be secured to the prongs of the forked member, a spring or other resilient means interposed between said retaining clip and a shoulder on the underside of the portion forming the cavity on the push member, the push member under the action of a biasing force maintaining contact between the closed inner end wall of the forked member and the other spherical surface on the knoblike portion, said push member being provided with at least one portion adapted to pass through the retaining clip, said one portion being guided therein and with another end portion remote from said end portion and having a cross-section identical with the corresponding opening in the retaining clip, said one portion being provided with one or more latching teeth for latching the push member when the tooth or teeth are angularly offset relative to the opening(s) in the retaining clip while maintaining the spring compressed, said spring being able to exert its force against the push member to ensure the force to be exerted by the push member against the spherical surfaces of the knoblike portion when, by a slight rotation about the axis of the knoblike portion, the push member is moved to a position such that the teeth or said one portion coincide with the corresponding opening(s) in the retaining clip, the spring then being able to accomplish its normal axial retaining function, said rotation being ensured during relative angular displacement of the shafts of the coupling by the spindles or rollers bearing against one of the V-shaped edges, the surfaces forming the edges acting as guiding means during said rotation.

Said other end portion of the push member acts as an automatic internal loading means and has an enlarged polygonal cross-section for latching onto the retaining clip which may be unlatched to free the biasing spring, whereas before the loading, the end of the push member projects beyond the retaining clip to enable it to bear against a member of the coupling for clicking the retaining clip into place on the forked member, and after loading the end portion of the push member is retracted thereby avoiding any possiblity of contact with the member.

The cross-section of said other end portion of the push member and the corresponding openings in the retaining clip may be polygonal e.g. triangular, square, hexagonal, or circular with a toothed periphery.

In one embodiment of the push member, the latching is effected by three finger portions having notches adapted to hook onto the retaining clip.

In another embodiment, the push member is provided with a three-arm central portion having teeth adapted to latch onto the retaining clip.

The system according to the invention is described in greater detail hereinbelow with reference to the accompanying drawings in which.

Figure 1:
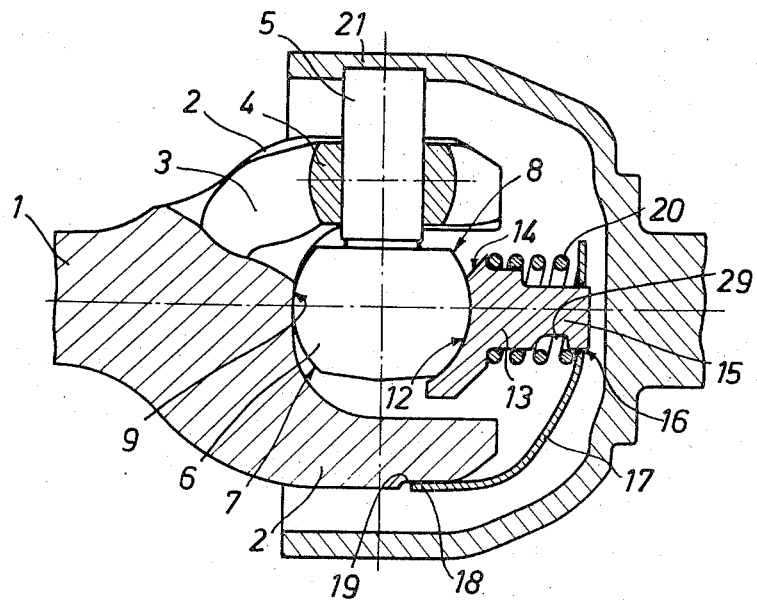
FIG. 1 shows an embodiment of a constant velocity universal joint with an assembly according to the invention shown in longitudinal section.

FIG. 1 illustrates in section an assembled constant velocity universal joint which allows a large angular displacement between the two shafts it couples. The joint comprises a forked member 1 with three angularly spaced prongs 2 having linear races 3 in which the rollers 4 rotate about spindles 5 disposed radially about the longitudinal axis of the forked member and fixed to a knoblike central portion 6 provided with two spherical concave surfaces 7 and 8.

Figure 2:
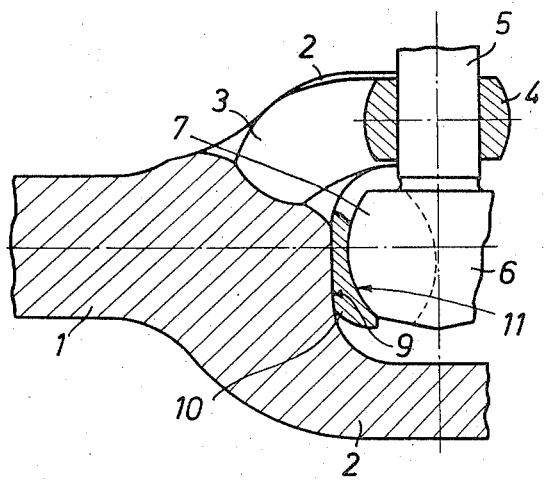
FIG. 2 illustrates additional means through which the kroblike portion is effectively brough into contact with the closed inner end wall of the forked member.

The spherical surface 7 is applied against a flat portion 9 of the closed inner end wall of the forked member 1 either directly or through the intermediary of a friction element 10 (FIG. 2) having a concave surface 11.

Figure 3:
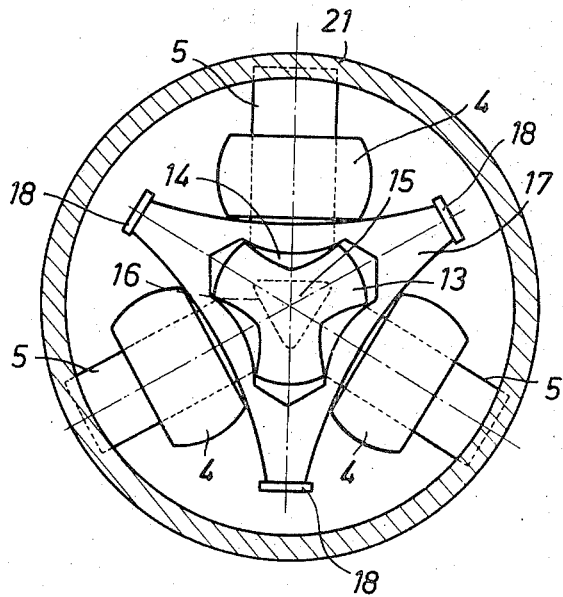
FIG. 3 shows an end view of the coupling of FIG. 1, the cup-shaped member being removed.

Against the spherical surface 8 is applied the concave spherical cavity 12 at one end of a push member 13 which has V-shaped radial cut-outs 14 which provide the push member with clearance at an angle relative to each one of the spindles 5 (FIG. 3).

The push member 13 is provided with a portion 15 guided by an opening 16 cut in a resilient retaining clip 17 (FIG. 3) with three arms. At the end of the portion 15 of the push member 13 remote from the cavity 12 is an enlarged end portion having the same cross-section as the opening 16 in the guiding zone so as to ensure the holding of the push member relative to the retaining clip while leaving it the freedom of sliding and oscillatory movement.

Figure 4:
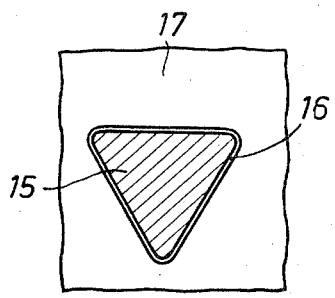
FIGS. 4 and 5 show two different polygonal sections for the other end portion of the push member.
Figure 5:
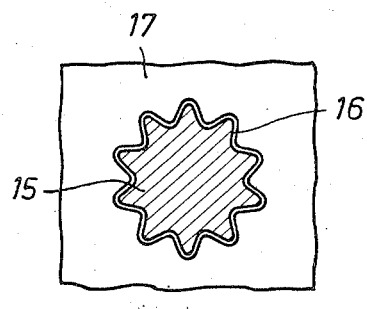

The opening 16 in the retaining clip 17 and the cross-section of the enlarged end portion of the push member may be triangular as shown in FIGS. 3 and 4, square, hexagonal, or circular with a toothed periphery as shown in FIG. 5. Any shape of cut-out or opening capable of effecting the guiding and latching of the retaining member may be adopted.

The securing of the retaining clip is effected by the lugs 18 forming a continuation of the arms of the retaining clip 17 and bent back parallel to the axis of the push member 13. The lugs 18 of the resilient retaining clip 17 are designed to be anchored radially in slots 19 formed in each prong 2 of the forked member 1 (FIGS. 1 and 6).

Between the retaining clip 17 and the push member 13 (FIG. 1) a helical spring 20 or any other resilient means such as Belleville or corrugated washers are interposed and guided on the portion 15 of the push member. The resilient means ensures the axial biasing against a knoblike portion 6 which is thereby held axially in position by the engagement of the spherical surface 7 with the flat surface 9 of the closed inner end wall of the forked member 1.

The ends of the spindles 5 integral with the knoblike portion 6 are received in recesses in the cup-shaped member 21 as shown in FIG. 3.

Figure 6:
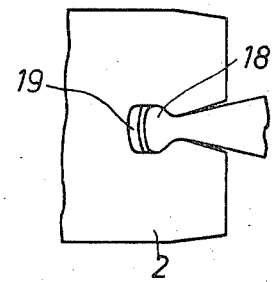
FIG. 6 illustrates the manner of securing the lugs of the retaining member on the arms of the forked member.

The wall of the cup-shaped member 21 and the forked member 1 prevent access which would otherwise enable the three lugs 18 of the retaining clip 17 to be grabbed simultaneously and held with a force sufficient to overcome the force of the spring 20 and with a precision to enable the lugs to be secured in the slots 19 in the prongs 2 of the forked member 1 (FIG. 6).

Figure 7:
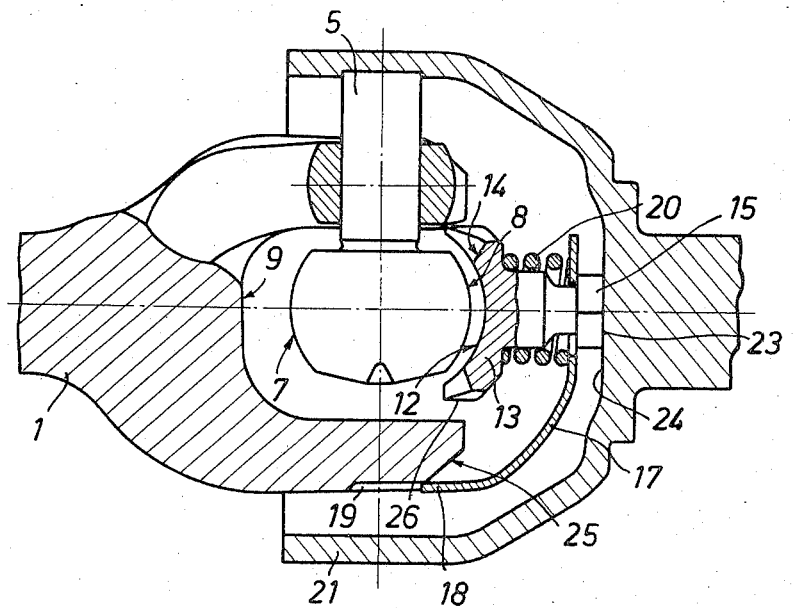
FIG. 7 shows the combination in the latched position of the push member.
Figure 8:
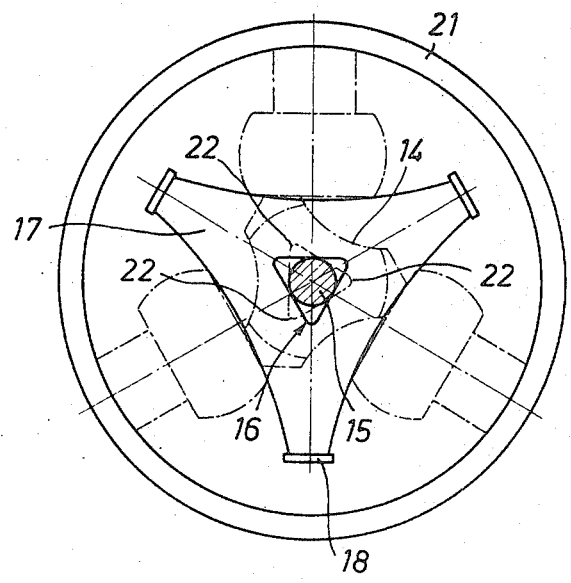
FIG. 8 shows the rotational movement to be effected in order to latch or unlatch the push member from the interior with the rollers and spindles removed.

The assembly functions as follows:

FIGS. 7 and 8 illustrate the constant velocity universal joint ready to be assembled. The spring 20 is compressed as much as possible between the shoulder formed at the underside of the cavity 12 and the retaining clip 17 by means of the angular displacement of the enlarged triangular portion of the element 15 relative to the hole 16 in the retaining clip (FIG. 8). Abutments or latching teeth are formed by the apices 22 of the enlarged triangular end portion of the push member 13.

The end surface 23 of the end portion of the push member extends beyond the outer surface of the retaining clip 17 in this position.

In order to easily assemble, it is merely necessary to arrange the cup-shaped member 21 with its opened end facing upwards, position the retaining clip 17 so that its lugs 18 are disposed facing the slots 19 in the prongs of the forked member 1 and then drive the forked member axially towards the cup-shaped member. The end surface 23 of the push member 13 comes to bear against the closed inner end wall 24 of the cup-shaped member 21 and maintains the retaining clip 17 be means of the teeth apices 22.

The lugs 18 on the retaining clip slide along the conical surfaces 25 on the forked member 1 until the ends of the three lugs 18 of the retaining member click into position into the slots 19 as shown in FIG. 6.

During this movement, the push member 13 and the retaining clip 17 may be considered as fixed relative to one another in view of the force the spring 20 exerts against each through the intermediary of the teeth or apices 22. Consequently, the outer edge surfaces 26 (FIG. 7) assure a guiding which favors the simultaneous clicking into place of the three lugs of the retaining clip.

The proper positioning of the retaining clip is thereby easily and securely effected with a minimum of axial force being exerted to overcome the resilient radial force of the lugs 19 of the retaining clip.

Figure 9:
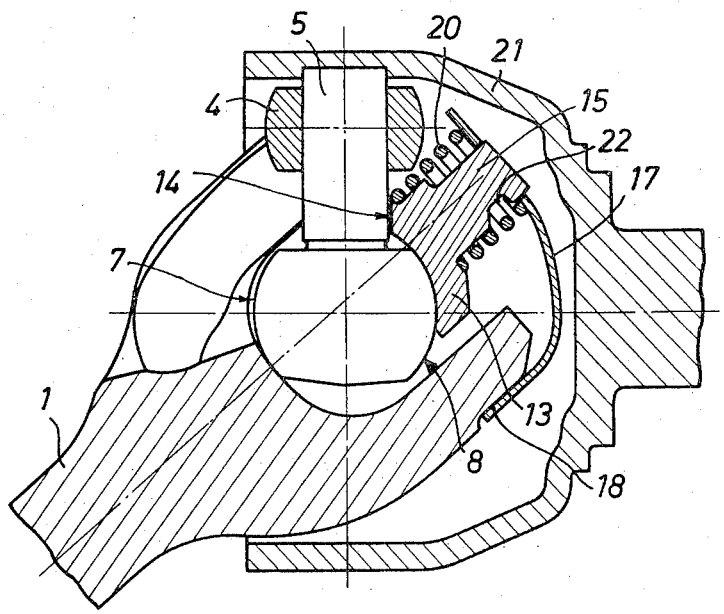
FIG. 9 illustrates the position of the forked member for latching the push member.

In order for the initial biasing force of the spring 20 to be exerted against the spherical surface 8, the shafts must be angularly displaced relative to each other while the spindles 5 or the rollers 4 bear against the surfaces of the radial V-shaped cut-outs 14 on the push-member 13. These surfaces act as camming surfaces and cause the push member 13 to be angularly displaced relative to the retaining clip 17 as shown in FIG. 9. Thus the teeth 22 (FIG. 8) move out of engagement, and the spring 20 expands until the push member 13 comes into abutting relationship with the spherical surface 8. The portion 15 is simultaneously retracted leaving a space between its end surface 23 and the closed inner end wall of the cup-shaped member 21 thereby allowing the angular clearance of the constant velocity joint. The knoblike portion 6 is thus axially maintained by the contact of its spherical surface 7 against the closed inner end wall 9 of the forked member 1 and by the force the spherical cavity 12 exerts against the spherical surface 8.

A no-clearance retaining assembly is thus effected having a predetermined biasing force independant of inaccuracies in the machining of the component parts.

The coupling is disassembled by freeing the lugs 18 from the slots 19 (FIG. 6) by means of a screwdriver.

The compressing of the spring 20 required for the reassembly of the joint is carried out with the forked member removed by pulling simultaneously on the three lugs 18 of the retaining member 17 outwardly along the axis of the cup-shaped member, then by slightly rotating which angularly displaces the portion 15 of the push member 13 relative to the opening in the retaining member as shown in dash-dotted lines in FIG. 8. After removing the pulling force the teeth maintain spring 20 in its compressed position by bearing against the portion of the retaining clip defining the triangular hole 16.

The forked member is then re-assembled easily and without requiring the application of any force as described above.

Figure 10:
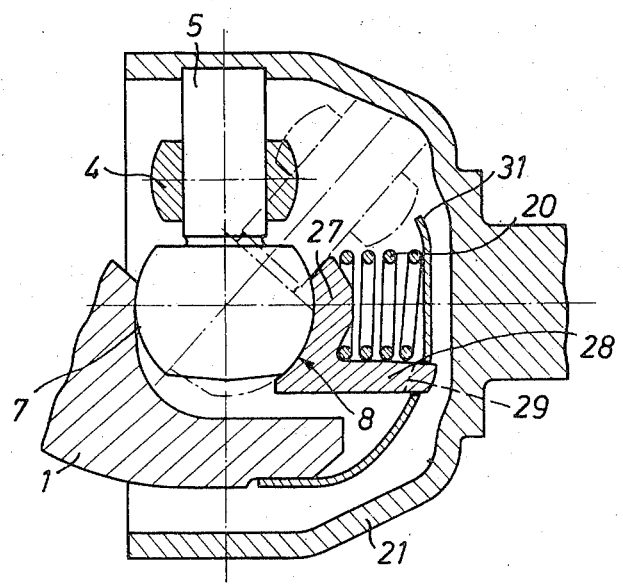
FIGS. 10 and 11 illustrate an alternative embodiment.
Figure 11:
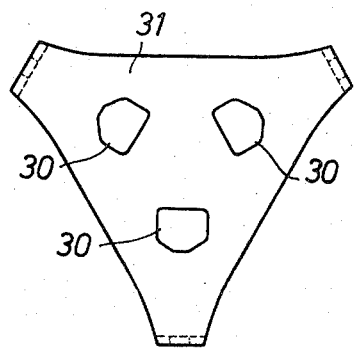
Figure 14:
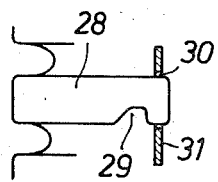
FIGS. 14 and 15 show the latching of the push member on the retaining clip.
Figure 15:
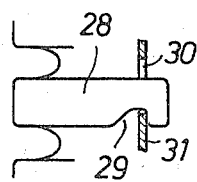

FIGS. 10 and 11 illustrate an alternative embodiment in which the push member 27 instead of having portion 15 (FIG. 1) is provided with three finger portions 28 with notched teeth 29 which are secured onto the retaining clip 31 during assembly and slidable after assembly in three holes 30 angularly spaced by 120° and formed in the retaining clip. The finger portions 28 are generally rectangular in cross section and similar to the section of the openings 30 in the retaining clip as illustrated in FIGS. 11, 14 and 15.

This embodiment functions in substantially the same way as described above.

Figure 12:
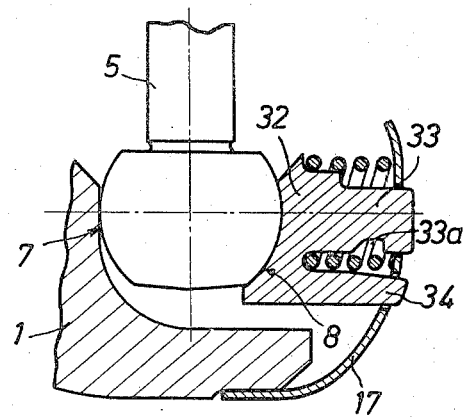
FIG. 12 shows an alternative embodiment of the push member.

FIG. 12 shows another alternative embodiment in which the push member 32 combines the features of the two preceding embodiments, that is, it comprises a guiding element 33 with a latching notched tooth 33a at its end and three arms 34 which are mainly intended to act as stable bearing supports against the closed inner end wall of the cup-shaped member while the retaining clip into position on the forked member.

Figure 13:
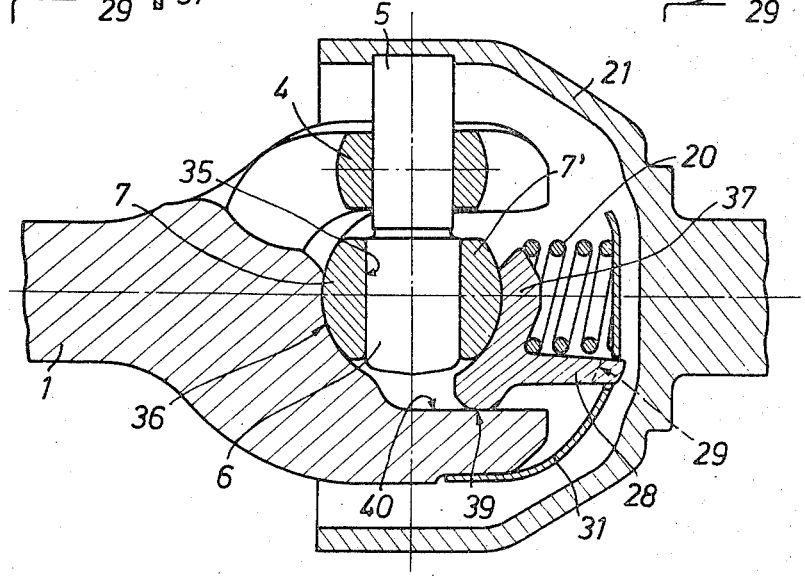
FIG. 13 shows a further alternative embodiment of the push member.

FIG. 13 shows a further alternative embodiment in which the knoblike portion 6 supporting the spindles 5 is axially retained by annular discs or sleeves 7 and 7' with a planar internal surface 35 and spherical external surface 36. The push member 37 has either three finger portions 28 with teeth 29, guiding element with teeth or the combination of three finger portions and a portion as in FIGS. 12 and 7 respectively.

A supplementary radial guiding is provided by the contact of the spherical surfaces 39 in the closed inner wall 40 of the forked member.

The joint is assembled in exactly the same manner as the other embodiments.

The push member 13 and the discs 10 and 33 may be formed of tempered steel, plastic material, such as nylon, or any other suitable material.

The previous embodiments particularly concern constant velocity universal joints with three rollers but the retaining assembly according to the invention may be used in other types of couplings.

The invention is applicable to the transmission for rotational movements and couplings.

What we claim is:

1. An internal biasing assembly with automatic triggering for axially retaining a constant velocity universal joint of the type having a forked member adapted to be fixed to a first shaft and having three prongs with linear roller races therebetween, rollers adapted to roll in said roller races mounted to slide and rotate on spindles arranged in a star pattern about a knoblike central portion having two spherical surfaces, said spindles being mounted in the cup-shaped member, comprising a push member with a spherical cavity formed at one end defined between three radial cut-outs with V-shaped edges, said cavity being complementary to one of said spherical surfaces on the knoblike central portion, a three arm star-shaped retaining clip, the arms of which being adapted to be secured to the prongs of the forked member, the other end of the push member remote from the cavity being adapted to be guided in a corresponding opening in the retaining clip, the cross-section of said other end portion being the same as the configuration of said corresponding opening, resilient means interposed between a shoulder disposed under the cavity in the push member and the portion of the retaining clip surrounding the opening, said resilient means producing a biasing force for maintaining the other spherical surface on the knoblike central portion in contact with a closed inner end wall of the forked member, said other portion of the push member being provided with at least one latching tooth for holding the push member and maintaining the resilient means compressed when the teeth are angularly offset relative to the opening in the clip, said resilient means being capable of exerting its force against the push member for maintaining the cavity on the push member in contact with said one of the spherical surfaces when the push member is slightly rotated about its longitudinal axis in order to move the other end portion on the push member into alignment with the opening in clip, said resilient means axially retaining the joint when said other end portion is in alignment with the opening in the clip.

2. An assembly according to claim 1, wherein the rotation of the push member for freeing it from its latched position is effected by pivoting the first shaft relative to the second shaft so that a portion fixed for movement cup-shaped member bears against one of the V-shaped edges of the cut-outs the surfaces of the edges acting as camming surfaces during the pivoting thereby rotating the push member.

3. An assembly according to claim 1, wherein the other end of the push member effecting the automatic internal loading thereof has an enlarged polygonal cross-section adapted to be retained by and released from the retaining clip; before the loading of push member, the other end being adapted to extend beyond the retaining clip to bear against the cup-shaped member aiding the securing of the arms to the prongs of the forked member, after the loading of the push member, the other end portion being retracted to avoid any risk of contact with the cup-shaped member.

4. An assembly according to claim 1, wherein the other end of the push member has a triangular cross-section.

5. An assembly according to claim 1, wherein the end of the push member has a toothed circular cross-section.

6. An assembly according to claim 1, wherein a friction element is disposed on the closed inner end wall of the forked member for effectively bringing the other spherical surface on the knoblike portion in contact with said end wall.

7. An assembly according to claim 1, wherein each of the prongs are provided with slots for receiving lugs on the end of the arms of the retaining clip.

8. An assembly according to claim 1, further comprising three fingers provided on the push member and having latching teeth for latching onto portions defining additional openings in the clip member.

9. An assembly according to claim 1, wherein the push member is provided with a central portion on which the resilient means is arranged and with three fingers having latching teeth adapted to be latched onto the clip.

10. An internal biasing and retaining assembly for constant velocity universal joints of the tyep comprising a cup-shaped member, a forked member with three angularly spaced-apart prongs forming linear roller races therebetween, rollers adapted to roll in said roller races and mounted to slide and rotate on spindles arranged in a star pattern about a knoblike central portion having two spherical surfaces, said spindles being mounted in the cup-shaped member, and a star-shaped retaining clip with flexible arms adapted to be secured to the prongs of the forked member, comprising a push member having a spherical cavity formed in one end complementary to one of said spherical surfaces on the knoblike central portion and latching teeth remote from the cavity adapted to extend through at least one hole in said star-shaped member for latching engagement therewith, and resilient means arranged between said one end of the push member and the star-shaped member, said push member having a first position in which the latching teeth are latched on the star-shaped member and the spring is held in compression while the arms of the star-shaped member are being secured to the prongs of the forked member, and a second position in which the latching teeth are out of engagement with the star-shaped member and the resilient means urges the cavity on the push member into contact with said one of the spherical surfaces and the other the spherical surfaces into contact with the forked member for normal operation.

11. An assembly according to claim 10, wherein said latching teeth comprise apices of a closed geometrical figure forming the cross-section of the other end of the push member, and wherein the hole in the star-shaped retaining clip has the same configuration as said geometrical figure so that the other end may be guided in and pass through the hole when it is aligned therewith and latched thereon when the push member is angularly displaced relative to the hole in said retaining clip.

12. An assembly according to claim 10, wherein said latching teeth are disposed at the free ends of fingers extending from said one end of the push member.

13. An assembly according to claim 10, wherein, when the push member is in its first position, the pivoting of the forked member relative to the cup-shaped member automatical rotates the push member about its longitudinal axis to release the latching teeth from engagement with the hole in the retaining clip.

14. An assembly according to claim 11, further comprising a plurality of fingers with latching teeth adapted to extend through an equal plurality of holes in the retaining clip.

15. An assembly according to claim 11, wherein said resilient means is a coil spring, and wherein a portion of the push member intermediate its end portions acts as a guide for the coil spring.

* * * * *